United States Patent
Chun et al.

(10) Patent No.: US 10,034,288 B2
(45) Date of Patent: Jul. 24, 2018

(54) METHOD AND APPARATUS FOR TRANSMITTING FRAME IN WIRELESS LAN

(71) Applicant: LG ELECTRONICS INC., Seoul (KR)

(72) Inventors: Jinyoung Chun, Seoul (KR); Wookbong Lee, Seoul (KR); Kiseon Ryu, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/123,415

(22) PCT Filed: Feb. 16, 2015

(86) PCT No.: PCT/KR2015/001547
§ 371 (c)(1),
(2) Date: Sep. 2, 2016

(87) PCT Pub. No.: WO2015/133751
PCT Pub. Date: Sep. 11, 2015

(65) Prior Publication Data
US 2016/0374085 A1 Dec. 22, 2016

Related U.S. Application Data

(60) Provisional application No. 61/947,388, filed on Mar. 3, 2014, provisional application No. 62/026,706, filed on Jul. 21, 2014.

(51) Int. Cl.
*H04W 72/04* (2009.01)
*H04W 52/14* (2009.01)
(Continued)

(52) U.S. Cl.
CPC ..... *H04W 72/0453* (2013.01); *H04W 52/146* (2013.01); *H04W 52/247* (2013.01);
(Continued)

(58) Field of Classification Search
CPC . H04W 72/042; H04W 84/12; H04W 52/146; H04W 72/0406; H04W 72/0453;
(Continued)

(56) References Cited

U.S. PATENT DOCUMENTS 9,654,191 B2 * 5/2017 Sundberg ............. H04B 7/0452
2008/0130723 A1 6/2008 Lee et al.
(Continued)

FOREIGN PATENT DOCUMENTS

KR 1020080050754 A 6/2008
KR 1020110122114 A 11/2011
(Continued)

*Primary Examiner* — Robert Lopata
(74) *Attorney, Agent, or Firm* — Lee Hong Degerman Kang & Waimey

(57) ABSTRACT

A method and an apparatus for transmitting a frame in a wireless LAN are disclosed. The method for transmitting a frame in a wireless LAN comprises: by an STA, receiving an uplink transmission instruction frame from an AP; and by the STA, transmitting, to the AP, a first uplink frame as a response to the uplink transmission instruction frame, wherein the uplink transmission instruction frame instructs transmission of the first uplink frame and a second uplink frame on overlapping time resources, the first uplink frame is transmitted at a transmission timing determined on the basis of UIFS, and the UIFS may be a fixed value.

15 Claims, 15 Drawing Sheets

(51) Int. Cl.
*H04W 52/24* (2009.01)
*H04W 52/36* (2009.01)
*H04W 52/58* (2009.01)
*H04W 74/04* (2009.01)
*H04W 84/12* (2009.01)

(52) U.S. Cl.
CPC ....... *H04W 52/248* (2013.01); *H04W 52/362* (2013.01); *H04W 52/58* (2013.01); *H04W 72/0406* (2013.01); *H04W 74/04* (2013.01); *H04W 72/042* (2013.01); *H04W 84/12* (2013.01)

(58) Field of Classification Search
CPC ............. H04W 72/1289; H04W 28/06; H04W 52/247; H04W 52/248; H04W 52/362; H04W 52/58; H04W 74/04; H04W 74/0808
USPC .......................................................... 370/330
See application file for complete search history.

(56) References Cited

U.S. PATENT DOCUMENTS

| | | | |
|---|---|---|---|
| 2011/0223924 A1* | 9/2011 | Lohr | H04W 72/042 455/450 |
| 2012/0069793 A1 | 3/2012 | Chung et al. | |
| 2012/0218982 A1* | 8/2012 | Lee | H04L 1/0009 370/338 |
| 2012/0300874 A1* | 11/2012 | Zhang | H04L 5/0048 375/295 |
| 2013/0286959 A1* | 10/2013 | Lou | H04W 72/04 370/329 |
| 2014/0269659 A1* | 9/2014 | Wentink | H04W 28/065 370/338 |
| 2014/0294020 A1* | 10/2014 | You | H04L 25/0228 370/474 |
| 2015/0063190 A1* | 3/2015 | Merlin | H04L 5/0037 370/312 |
| 2015/0110046 A1* | 4/2015 | Merlin | H04B 7/0452 370/329 |
| 2015/0110093 A1* | 4/2015 | Asterjadhi | H04W 74/008 370/338 |
| 2015/0131517 A1* | 5/2015 | Chu | H04L 5/0007 370/312 |
| 2017/0289987 A1* | 10/2017 | Seok | H04W 72/0406 |

FOREIGN PATENT DOCUMENTS

| | | |
|---|---|---|
| KR | 1020120038399 A | 4/2012 |
| WO | 2010095883 A2 | 8/2010 |
| WO | 2011043636 A2 | 4/2011 |
| WO | 2011108832 A2 | 9/2011 |

* cited by examiner

- 8 AP antennas, 6 single stream uplink clients
- MMSE with ideal training
- 1000B packets, 64-QAM, rate 5/6, channel D-NLOS
- Timing differences are a) 0, b) 200ns, c) 400ns, d) 600 ns Uplink Frequency Differences

- 8 AP antennas, 6 single stream uplink clients
- MMSE with ideal training but with pilot phase tracking per client
- 1000B packets, 64-QAM, rate 5/6, channel D-NLOS
- Frequency errors are a) 0, b) 2 kHz, c) 4 kHz, d) 8 kHz

- 8 AP antennas, 6 single stream uplink clients
- MMSE with ideal training
- PER and SNR sho,vn are from the clients with smallest po,ver
- 1000B packets, 64-QAM, rate 5/6, channel D-NLOS
- AP receiver has a -40 dBc I/Q imbalance
- Power differences are a) 0, b) 4 dB, c) 6 dB, d) 8 dB

METHOD AND APPARATUS FOR TRANSMITTING FRAME IN WIRELESS LAN

CROSS-REFERENCE TO RELATED APPLICATIONS

This application is the National Stage filing under 35 U.S.C. 371 of International Application No. PCT/KR2015/001547, filed on Feb. 16, 2015, which claims the benefit of U.S. Provisional Application No. 61/947,388, filed on Mar. 3, 2014 and 62/026,706, filed on Jul. 21, 2014, the contents of which are all hereby incorporated by reference herein in their entirety.

BACKGROUND OF THE INVENTION

Field of the Invention

The present invention relates to wireless communication and, most particularly, to a method and apparatus for transmitting a frame in a wireless LAN.

Related Art

In a wireless local area network (WLAN) system, distributed coordination function (DCF) may be employed as a method enabling a plurality of stations (STAs) to share a wireless medium. DCF is based on a carrier sensing multiple access with collision avoidance (CSMA/CA).

Generally, in operations under a DCF access environment, when a medium is not occupied (that is, idle) for a DCF interframe space (DIFS) interval or longer, an STA may transmit a medium access control (MAC) protocol data unit (MPDU) to be urgently transmitted. When the medium is determined to be occupied according to a carrier sensing mechanism, an STA may determine the size of a contention window (CW) using a random backoff algorithm and perform a backoff procedure. The STA may select a random value in the CW to perform the backoff procedure and determine backoff time based on the selected random value.

When a plurality of STAs attempts to access a medium, an STA having the shortest backoff time among the STAs is allowed to access the medium and the other STAs may suspend the remaining backoff times and wait until the STA having accessed the medium finishes transmission. When the STA having accessed the medium finishes frame transmission, the other STAs contend again with the remaining backoff times to acquire a transmission resource. As such, in the existing WLAN system, one STA occupies the entire transmission resource through one channel to transmit/receive a frame to/from an AP.

SUMMARY OF THE INVENTION

Technical Objects

An object of the present invention is to provide a method for transmitting a frame in a wireless LAN.

Another object of the present invention is to provide an apparatus performing a method for transmitting a frame in a wireless LAN.

Technical Solutions

In order to achieve the above-described technical object of the present invention, according to an aspect of the present invention, a method for transmitting a frame in a wireless LAN may include the steps of receiving by a STA (station) an uplink transmission indication frame from an AP (access point), and transmitting a first uplink frame by the STA to the AP as a response to the uplink transmission indication frame, wherein the uplink transmission indication frame may indicate a transmission of the first uplink frame and a second uplink frame within an overlapping time resource, wherein the first uplink frame may be transmitted at a transmitting timing being decided based on an UIFS (uplink interface space), and wherein the UIFS may correspond to a fixed value being included within a range that is greater than or equal to a maximum value of a SIFS (short interframe space) and that is smaller than a maximum value of a PIFS (PCF (point coordination function) interframe space).

In order to achieve the above-described technical object of the present invention, according to another aspect of the present invention, a STA transmitting a frame in a wireless LAN may include a RF (radio frequency) unit being configured to transmit or receive radio signals, and a processor being operatively connected to the RF unit, wherein the processor may be configured to receive an uplink transmission indication frame from an AP (access point), and to transmit a first uplink frame to the AP as a response to the uplink transmission indication frame, and, herein, the uplink transmission indication frame may indicate a transmission of the first uplink frame and a second uplink frame within an overlapping time resource, the first uplink frame may be transmitted at a transmitting timing being decided based on an UIFS (uplink interface space), and the UIFS may correspond to a fixed value being included within a range that is greater than or equal to a maximum value of a SIFS (short interframe space) and that is smaller than a maximum value of a PIFS (PCF (point coordination function) interframe space).

Effects of the Invention

By controlling the receiving timing of multiple uplink frames, which are received by the AP, the data transmission efficiency may be enhanced.

DESCRIPTION OF EXEMPLARY EMBODIMENTS

Figure 1:
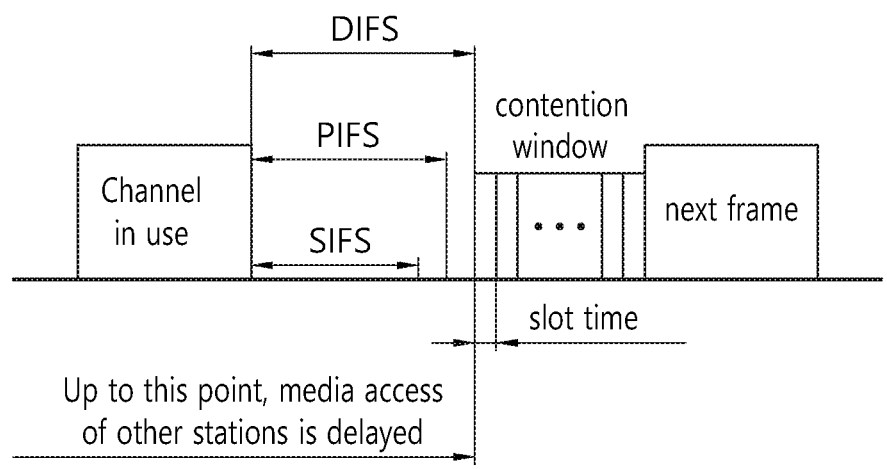
FIG. 1 is a conceptual view showing an interval (or gap) between frames.

FIG. 1 is a conceptual view showing an interval (or gap) between frames.

Referring to FIG. 1, a time difference between two frames being transmitted within a medium may be referred to as an IFS (interframe space). The priority of an STA occupying a wireless medium (or radio medium) may be decided based on IFSs having different lengths. Frames being transmitted within a medium may be transmitted based on IFS s having different lengths. For example, IFS s having different lengths may be used for transmitting frames within the medium.

(1) SIFS (short inter frame symbol): This is used for the transmission of RTS (request to send) frames/CTS (clear to send) frames, ACK (acknowledgement) frames.

(2) PIFS (PCF (point coordination function) IFS): This is used for the transmission of PCF frames (e.g., channel switch announcement frames, TIM (Traffic indication map) frames, and so on) and for the frame transmission of STAs performing channel access based on PCF (point coordination function).

(3) DIFS (DCF IFS): This is used for frame transmission of STAs performing DCF based channel access.

(4) EIFS (extended IFS): This is used only when a frame transmission error occurs, and this is not a fixed gap (or interval).

The calculation equation for each IFS is as shown below in Equation 1 to Equation 3, and the numerical values given in the parentheses next to each parameter may correspond to general numerical values respective to each parameter. The value of each parameter may vary in accordance with the capacity of the STA or in accordance with the communication environment. Each equation is disclosed in 9.3.7 DCF timing relation of the IEEE P802.11-REVmcTM/D2.0 document, which is disclosed in October 2013, and the parameters used in each equation are disclosed in 6.5.4 PLME-CHARACTERISTICS.confirm of the IEEE P802.11-REVmcTM/D2.0 document and 6.5 PLME SAP interface of the IEEE Std 802.11ac™-2013 document, and so on.

SIFS(16 μs)=aRxRFDelay(0.5)+aRxPLCPDelay(12.5)+aMACProcessingDelay(1 or <2)+aRxTx-TurnaroundTime(<2)

aRxTxTurnaroundTime=aTxPLCPDelay(1)+aRxTx-SwitchTime(0.25)+aTxRampOnTime(0.25)+aTxRFDelay(0.5)            <Equation 1>

Referring to FIG. 1, the SIFS may correspond to a value that is based on a RF (radio frequency) delay, a PLCP (physical layer convergence protocol) delay, MAC (medium access control) processing delay, and shifting time from Rx to Tx. For example, the SIFS may correspond to a time period starting from a time when the last symbol of a receiving frame of the STA is received from a medium (or air interface) up to a time when a first symbol of a transmitting frame of the STA is transmitted to the medium (or air interface).

PIFS(25 μs)=aSIFSTime+aSlotTime aSlotTime=aCCATime(<4)+aRxTxTurnaroundTime(<2)+aAirPropagationTime(<1)+aMACProcessingDelay(<2)           <Equation 2>

Herein, aAirProgationTime may correspond to two times the propagation time (or propagation delay) for signal transmission at a maximum distance between STAs that are synchronized to the furthermost slots within a communicatable range. Herein, the aAirProgationTime may correspond to a value that is equal to or less than 1 μs. The radio wave may be propagated at 300 m/μs.

DIFS(distributed(coordination function)interframe space)(34 μs)=aSIFSTime+2×aSlotTime     <Equation 3>

Referring to Equation 1 to Equation 3, the SIFS, PIFS, and DIFS values may vary in accordance with the capability of the STAs and/or in accordance with the wireless communication environment. For example, in accordance with the capability of the STAs and/or in accordance with the wireless communication environment, the SIFS may be given a maximum value of 16 μs, and the PIFS may be given a value ranging from a minimum value of 16 μs to a maximum value of 25 μs.

Such SIFS is required to be newly defined for the uplink transmission of multiple STAs.

An AP (access point) that operates in a wireless local network area (WLAN) system may transmit data to each of the multiple STAs through the same time resource. When the transmission from the AP to the STA is referred to as a downlink transmission, such transmission to the AP may also be expressed by using the term DL MU transmission (downlink multi-user transmission).

In the legacy wireless system, the AP was capable of performing DL MU transmission based on MU (multi-user) MIMO (multiple input multiple output), and such transmission may be expressed by using the term DL MU MIMO transmission. In the exemplary embodiment of the present invention, the AP may perform DL MU transmission based on OFDMA, and such transmission may be expressed by using the term DL MU OFDMA transmission. In case the DL MU OFDMA transmission is used, the AP may transmit a downlink frame to each of the multiple STAs through each of the multiple frequency resources within the overlapping time resource.

Each of the PPDU, frame, and data being transmitted via downlink transmission may be respectively expressed by using the terms downlink PPDU, downlink frame, and downlink data.

Conversely, the transmission from the STA to the AP may be referred to as an uplink transmission. The data transmission of multiple STAs to the AP within the same time resource may be expressed by using the term UL MU transmission (or uplink multi-user transmission). Each of the PPDU, frame, and data being transmitted via uplink transmission may be respectively expressed by using the terms uplink PPDU, uplink frame, and uplink data.

The current wireless LAN system does not support such UL MU transmission. Due to the following limitations, the current wireless LAN system cannot support the UL MU transmission.

In the current wireless LAN system, synchronization respective to the transmitting timing of uplink frames being transmitted from multiple STAs is not supported. For example, in the current wireless LAN system, it may be assumed that multiple STAs transmit uplink data through the same time resource. In the current wireless LAN system, each of the multiple STAs cannot know the transmitting timing of the uplink frames of other STAs. Therefore, it is difficult for the AP to receive multiple sets of uplink data within a decodable receiving timing difference range from each of the multiple STAs.

Additionally, in the current wireless LAN system, due to the multiple STAs, overlapping may occur between frequency resources that are being used for transmitting uplink data. For example, if each of the multiple STAs has a different oscillator, the frequency offset may be indicated differently. The frequency offset may correspond to a difference between a reference frequency band and a frequency band that is used by a STA. If each of the multiple STAs each having a different frequency offset simultaneously performs uplink transmission through different frequency resources, among the frequency domain that is being used by each of the multiple STAs, part of the frequency domain may be overlapped.

Additionally, in the legacy wireless LAN system, power control respective to each of the multiple STAs is not performed. The AP may receive signals of different power levels from each of the multiple STAs depending on the distance between each of the multiple STAs and the AP and the channel environment. In this case, it may be relatively difficult for signals being received at lower (or weaker) power levels to be detected by the AP as compared to the signals being received at higher (or stronger) power levels.

Hereinafter, the exemplary embodiment of the present invention discloses a UL MU transmission method, wherein, after each of the multiple STAs has received a downlink frame from the AP, each of the multiple STAs transmits an uplink frame to the AP depending on the received downlink frame. Such uplink frame transmission method of the STA may also be expressed by using the term downlink dependent UL MU transmission. More specifically, after the transmission of the downlink frames, which is performed by the AP, before other STAs attempt contention for performing uplink transmission, each of the multiple STAs, which are indicated based on the downlink frame, may transmit an uplink frame to the AP based on the UL MU transmission method. For example, in order to limit the channel access to other STAs, each of the STAs, which are indicated based on the downlink frame, may receive a downlink frame and may transmit an uplink frame to the AP within a predetermined period of time. Alternatively, a separate TXOP (transmission opportunity) may be configured for an uplink transmission respective to each of the multiple STAs, which are indicated based on the downlink frame.

The uplink transmission may be performed by each of the multiple STAs within a frequency domain or a spatial domain.

In case the uplink transmission performed by each of the multiple STAs is respectively performed within different frequency domains, different frequency resources respective to each of the multiple STAs may be allocated as the uplink transmission resource based on OFDMA (orthogonal frequency division multiplexing access). Such transmission method using different frequency resources may also be expressed by using the term UL MU OFDMA transmission method.

In case the uplink transmission performed by each of the multiple STAs is respectively performed within different spatial domains, different spatial streams (or space time streams) may be allocated with respect to each of the multiple STAs, and each of the multiple STAs may transmit uplink data to the AP through different spatial streams. Such transmission method using different spatial streams may also be expressed by using the term UL MU MIMO transmission method. The UL MU transmission method may also be used as a meaning that includes the UL MU OFDMA transmission method and the UL MU MIMO transmission method.

Hereinafter, the UL MU transmission method will be disclosed in detail.

Figure 2:
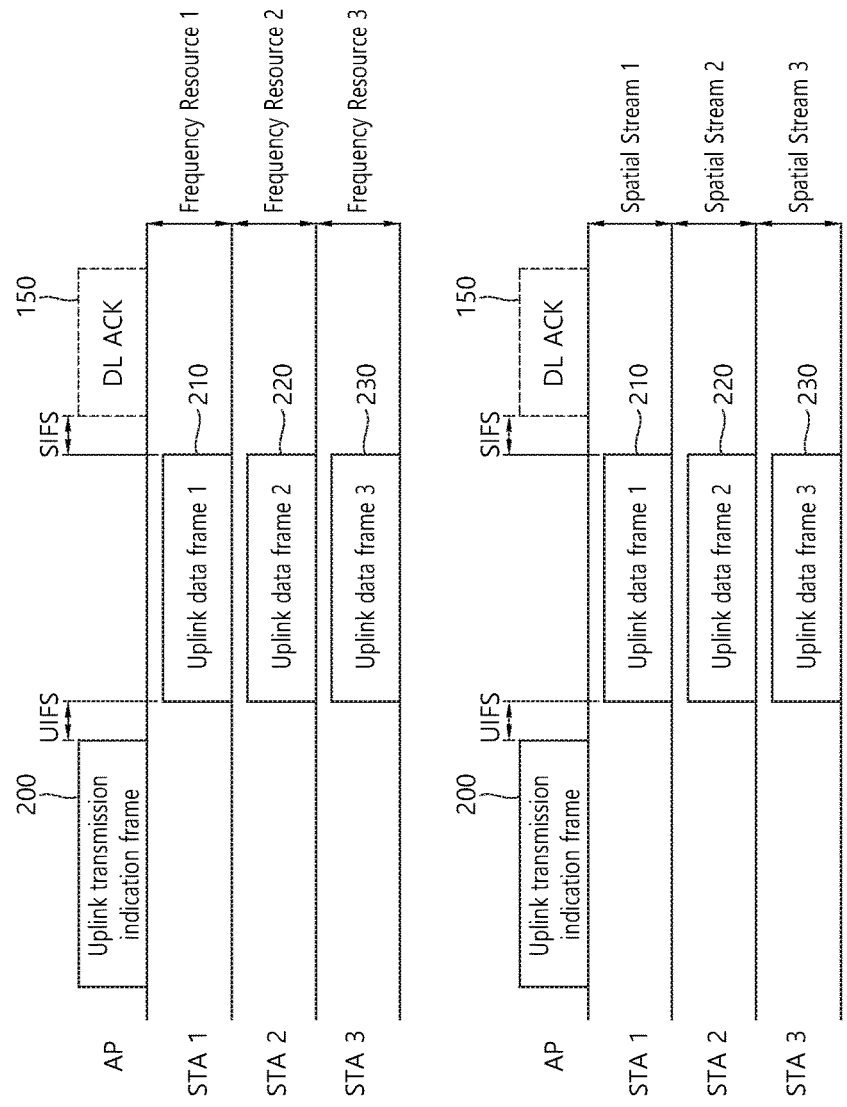
FIG. 2 is a conceptual view showing a UL MU transmission based on an uplink transmission indication according to an exemplary embodiment of the present invention.

FIG. 2 is a conceptual view showing a UL MU transmission based on an uplink transmission indication according to an exemplary embodiment of the present invention.

Referring to FIG. 2, each of the multiple STAs may perform uplink transmission based on an uplink transmission indication frame 200, which is transmitted by the AP. Each of the multiple STAs may receive the uplink transmission indication frame 200 from the AP, and, after a UIFS (uplink interframe space), each of the multiple STAs may respectively transmit uplink data frames 210, 220, and 230 to the AP. The UIFS will be described later on in more detail.

The uplink transmission may be performed by each of the multiple STAs within a frequency domain or a spatial domain.

The uplink transmission indication frame 200 may include information for the uplink transmission of the multiple STAs. For example, the uplink transmission indication frame 200 may include at least one of information indicating each of the multiple STAs or a group of multiple STAs performing the uplink transmission, MCS (modulation and coding scheme) information being used for the transmission of uplink data by each of the multiple STAs, information on the size of the uplink data that are available for transmission by each of the multiple STAs, and information on a TXOP (transmission opportunity) for the uplink transmission.

The size of the uplink data that are to be transmitted by each of the multiple STAs and/or the MCS for the transmission of the uplink data that are to be transmitted by each of the multiple STAs may differ from one another. Therefore, if the multiple STAs transmit valid (or significant) uplink data through uplink frames, the transmission duration respective to each of the uplink frames being transmitted by each of the multiple STAs may differ from one another. Accordingly, zero padding may be performed in order to equally configure the transmission duration of the uplink frames 210, 220, and 230 being transmitted by each of the multiple STAs based on the UL MU transmission method.

Alternatively, in case each of the multiple STAs respectively transmits an uplink frame 210, 220, and 230 through different frequency resources based on OFDMA in order to increase the degree of freedom, the transmission duration of the uplink frames being transmitted by each of the multiple STAs may be configured differently. In this case, the AP may transmit downlink ACK frames or block ACK frames to each of the multiple STAs after a SIFS while individually considering the transmitting timing of each of the multiple uplink frames.

In the exemplary embodiment of the present invention, in order to determine the transmitting timing of the uplink frames being transmitted based on the UL MU transmission method, the UIFS (uplink interframe space) may be newly defined.

The UIFS may correspond to a time period starting from a time when a last symbol of a reception frame (or reception PPDU) is being received from medium (or air interface) up to a time when a first symbol of a transmission frame (or transmission PPDU) is being transmitted to the medium (or air interface). The reception frame may correspond to an uplink transmission indication frame 200, and the transmission frame may correspond to uplink frames 210, 220, and 230.

The SIFS (short interframe space), which corresponds to the conventional (or legacy) interval (or gap) between frames may have a maximum value of approximately 16 μs. The SIFS may be given different value within a range of a maximum of 16 μs or below in accordance with a difference in the capability of each of the multiple STAs and the communication environment between each of the multiple STAs and the AP. Accordingly, in case the SIFS is being used for the transmission of the uplink frames 210, 220, and 230, a timing gap (or time difference) may occur between the uplink frames 210, 220, and 230, which are being transmitted from each of the multiple STAs.

As a more detailed example, due to a difference in the capacity of each of the multiple STAs, the uplink frame transmitting timing may vary within a time resource that is allowed by the SIFS. More specifically, a difference may occur between the transmitting timing for each of the multiple uplink frames 210, 220, and 230, which are transmitted by each of the multiple STAs. The difference between the transmitting timing for each of the multiple uplink frames 210, 220, and 230 may generate a difference in the receiving timing (or synchronization) of each of the multiple uplink frames 210, 220, and 230 of the AP. Therefore, in case the uplink frames 210, 220, and 230 are transmitted by each of the multiple STAs based on the SIFS, a difference in the receiving timing of the multiple uplink frames may become larger than the difference in the decodable receiving timing respective to the multiple uplink frames 210, 220, and 230 of the AP. For example, in case the AP communicates with the multiple STAs based on OFDMA, the AP may carry out a transform based on a single FFT with respect to the multiple uplink frames 210, 220, and 230, which are transmitted by the multiple STAs. In case the difference in the receiving timing of each of the multiple uplink frames 210, 220, and 230 is within a below a predetermined range, the AP may carry out a transform based on a single FFT with respect to the multiple uplink frames 210, 220, and 230.

Therefore, the UIFS may be defined for the decoding of the multiple uplink frames 210, 220, and 230 of the AP. The size of the UIFS may correspond to a value that is decided so that the difference in the receiving timing of the multiple uplink frames 210, 220, and 230 of the AP can be set to be within the difference in the decodable receiving timing respective to the multiple uplink frames 210, 220, and 230 of the AP. For example, the UIFS may correspond to a fixed value.

The difference in the decodable receiving timing respective to the multiple uplink frames 210, 220, and 230 may be within a GI (guard interval) (or CP (cyclic prefix). For example, the UIFS may be decided as a maximum SIFS value of multiple STAs performing UL MU transmission, or the UIFS may be decided as one of a value that is equal to or greater than the maximum SIFS value and a value that is less than a maximum PIFS value.

For example, it may be assumed that the maximum SIFS value is equal to 16 μs, that the minimum value of the PIFS is greater than 16 μs, and that the maximum PIFS value is equal to 25 μs. In this case, for example, the UIFS may correspond to a fixed value that is equal to 16 μs or that is equal to or greater than 16 μs and less than 25 μs.

Alternatively, considering a change in the IFS values (SIFS, DIFS, and so on), the UIFS information may also be transmitted by the AP. For example, when performing system configuration (or when performing initial access of the STA), the UIFS information may be transmitted from the AP to the STA through a downlink frame, or the UIFS information may also be transmitted by the AP to the STA, which is to perform UL MU transmission, through an uplink transmission indication frame. In this case, also, the UIFS information may be given a value that is equal to or greater than 16 μs.

As a more detailed example, the UIFS information may be transmitted through a feedback frame, such as a frame for deciding a group ID (identifier), a NDP (null data packet) frame, and so on, an uplink transmission indication frame 200, and so on.

Figure 3:
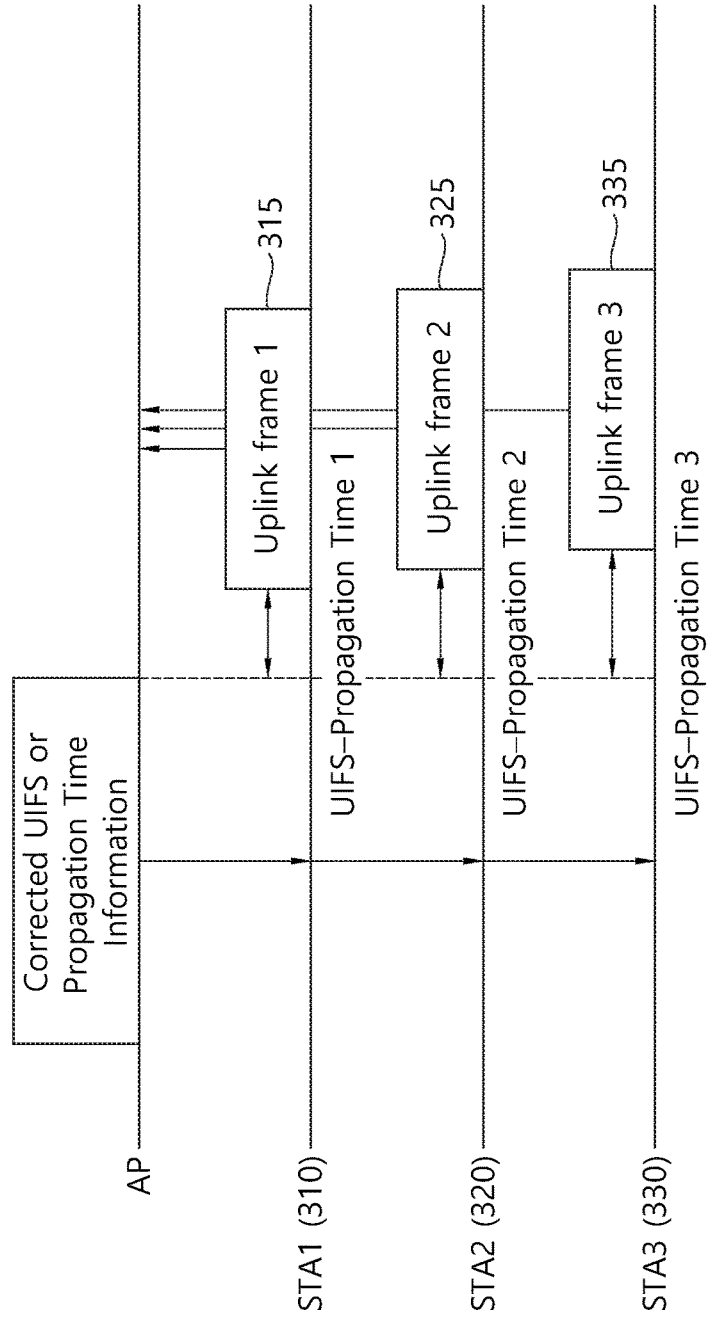
FIG. 3 is a conceptual view showing a UIFS based uplink frame transmission according to an exemplary embodiment of the present invention.

FIG. 3 is a conceptual view showing a UIFS based uplink frame transmission according to an exemplary embodiment of the present invention.

In FIG. 3, a transmission of uplink frames respective to each of the multiple STAs based on UIFS is disclosed.

After receiving an uplink indication frame, each of the multiple STAs may decide a transmitting timing of the uplink frame. For example, in case the UIFS value is a fixed value, the AP may receive uplink frames from each of the multiple STAs at a timing gap (or receiving time difference) that is two times the propagation delay (or propagation time) of each of the multiple STAs.

The propagation delay corresponds to a delay time that is decided based on a wireless communication environment and a distance between the STA and the AP. For example, the propagation delay may correspond to a time period ranging from a completion time of the transmission of the uplink frame of the STA and up to a start time of the reception of the uplink frame of the AP. The propagation delay may correspond to an aAirPropagationTime. In case the maximum value of the aAirPropagationTime is equal to 1 μs, the propagation delay may generally be given a value that is smaller than 1 μs (propagation delay<<1 μs). Therefore, a difference range of the receiving timings of the AP respective to most of the uplink frames that are transmitted from each of the multiple STAs may correspond to values ranging within a CP length (0.8 μs). The difference range between the receiving timings of the AP ranging within the CP length may correspond to a correctable range.

However, later on, in the wireless LAN communication environment, a distance between the AP and the STA may become larger, and, accordingly, the propagation time may become more extended. In this case, when performing the transmission of the UL MU frames, the transmission may be carried out based on a longer CP (e.g., long/double/triple CP) as compared to the legacy CP, or the transmitting timing of the uplink frame of the STA performing the UL MU transmission may be corrected based on the propagation time.

Referring to FIG. 3, the propagation time for performing correction may be decided by the AP or STA. For example, the AP may acquire (or estimate) information on the propagation time in order to perform communication with the STA based on its frame exchange procedure with the STA. Additionally, the STA may acquire (or estimate) information on the propagation time in order to perform communication with the AP based on its frame exchange procedure with the AP, and the STA may transmit (or report) the acquired information on the propagation time to the AP.

According to the exemplary embodiment of the present invention, the AP may transmit the corrected UIFS information, which is decided based on the propagation time respective to each of the multiple STAs, to each of the multiple STAs performing the UL MU transmission. Alternatively, apart from the UIFS information, the AP may also transmit information on a propagation time that is to be considered when transmitting uplink frames. Each of the multiple STAs performing UL MU transmission may perform uplink transmission while considering the corrected UIFS information, which is transmitted by and received from the AP, or while considering the information on the propagation time.

For example, each of the multiple STAs may decide a transmitting timing of the uplink frame while considering the UIFS information and the information on a propagation time that is to be considered when transmitting uplink frames. More specifically, STA1 310 may decide UIFS-Propagation Time 1 as its transmitting timing and may then transmit Uplink Frame 1 315, STA2 320 may decide UIFS-Propagation Time 2 as its transmitting timing and may then transmit Uplink Frame 2 325, and STA3 330 may decide UIFS-Propagation Time 3 as its transmitting timing and may then transmit Uplink Frame 3 335.

Based on the correction of the transmitting timing respective to each of the multiple STAs, the AP may receive multiple uplink frames from each of the multiple STAs within decodable receiving timing differences respective to multiple uplink frames.

Even in case the multiple STAs fail to receive the information on the propagation time for correcting the transmitting timing of the uplink frames from the AP, each of the multiple STAs may also decide the transmitting timing of the uplink frames based on the propagation time, which each of the multiple STAs has estimated on its own.

Figure 4:
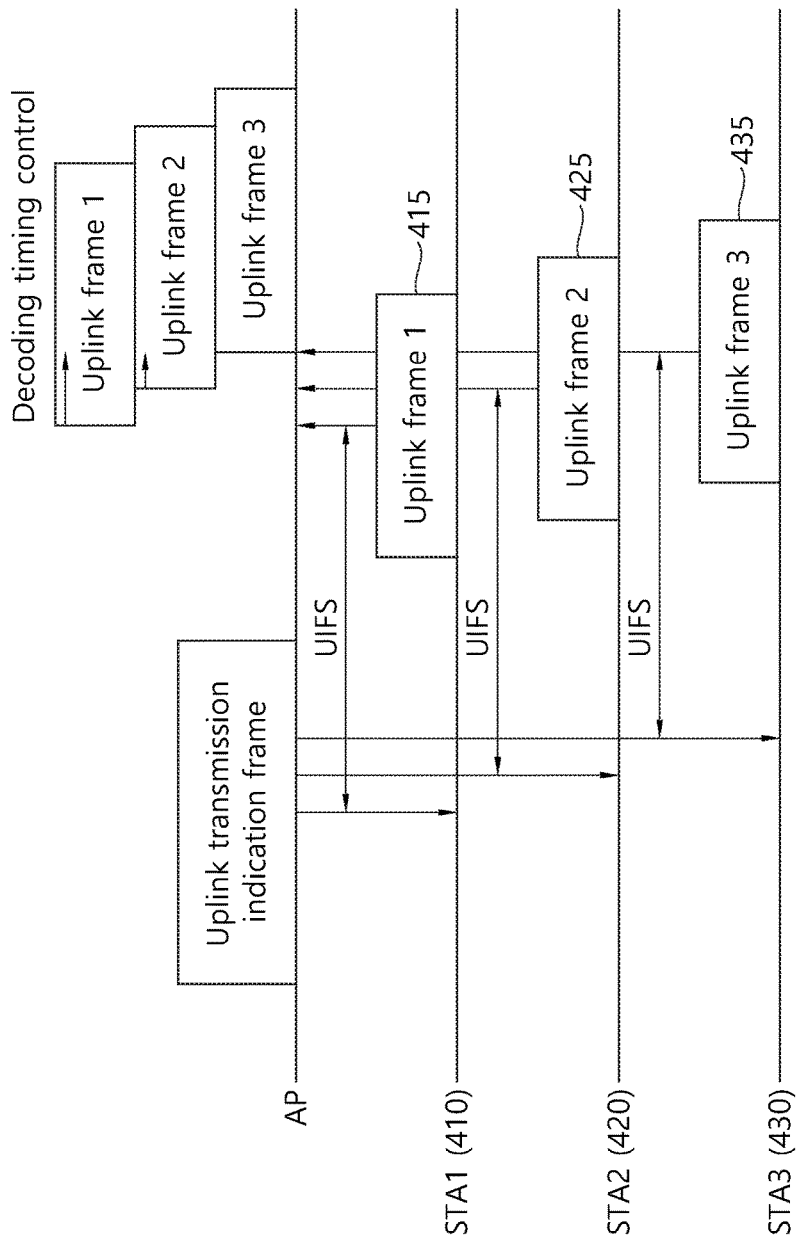
FIG. 4 is a conceptual view showing a UIFS based uplink frame transmission according to an exemplary embodiment of the present invention.

FIG. 4 is a conceptual view showing a UIFS based uplink frame transmission according to an exemplary embodiment of the present invention.

In FIG. 4, a transmission of uplink frames respective to each of the multiple STAs based on UIFS and a correction of the receiving timing of the AP are disclosed.

Referring to FIG. 4, in case the AP knows the propagation time respective to each of the multiple STAs, the AP may adjust the receiving timing or decoding (or demodulation) timing of the uplink frames, which are received from each of the multiple STAs.

For example, each of the multiple STAs may transmit the uplink frames based on the same UIFS. In this case, the AP may receive uplink frames from each of the multiple STAs at different timings. The AP may adjust the decoding (or demodulation) timings of the multiple uplink frames that are received at different timings while considering the propagation time respective to each of the multiple STAs. For example, the AP may perform processing after storing part of the uplink frame data. By using such method, the AP may perform decoding on the multiple uplink frames.

As a more detailed example, the AP may adjust the receiving timing or decoding (or demodulation) timing respective to each of Uplink Frame 1 415, Uplink Frame 2 435, and Uplink Frame 3 435, which are respectively received from STA1 410, STA2 420, and STA3 430, and, accordingly, the AP may perform processing on Uplink Frame 1 415, Uplink Frame 2 435, and Uplink Frame 3 435.

Figure 5:
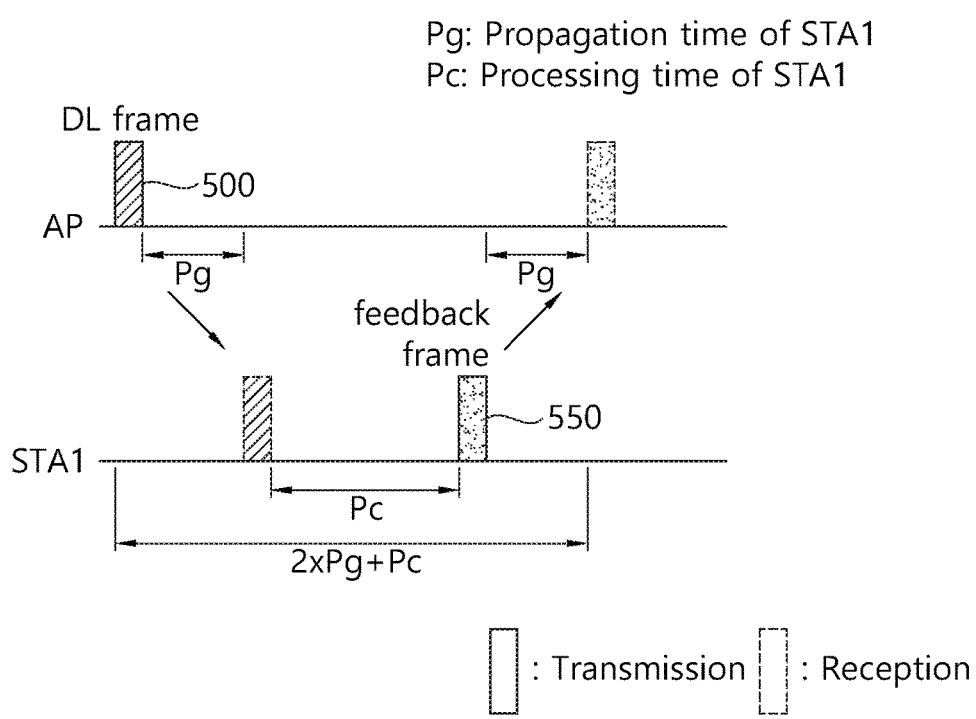
FIG. 5 is a conceptual view showing a UIFS based uplink frame transmission according to an exemplary embodiment of the present invention.

FIG. 5 is a conceptual view showing a UIFS based uplink frame transmission according to an exemplary embodiment of the present invention.

In FIG. 5, a transmission of uplink frames respective to each of the multiple STAs based on UIFS is disclosed.

Referring to FIG. 5, the AP may transmit a downlink frame (feedback request frame) 500 for feedback of the STA. After receiving the feedback request frame 500, and after a Pc (processing time), the STA may transmit the feedback frame 500 to the AP. The processing time may include a RF delay, a PLCP delay, a MAC processing delay, and a shifting time from Rx to Tx.

In the exemplary embodiment of the present invention, the UIFS may be configured in order to allow the multiple STAs to have the same processing time. It will be assumed herein that the STA knows in advance the UIFS having the same fixed value. For example, when performing initial access, the STA may receive UIFS information from the AP.

After receiving the downlink frame 500, the STA decodes the received downlink frame 500 so as to create a feedback signal. Then, after waiting for transmission, the STA may transmit the feedback frame 550 at the transmitting timing, which is decided based on the UIFS.

Then, after 2×Pg+Pc, the AP may receive the feedback frame 550 from the STA, and, then, based on the receiving timing of the feedback frame, the propagation time of the STA may be decided. More specifically, since the Pc is a fixed value, the propagation time (Pg) may be acquired based on the receiving timing of the feedback frame 550. In case the propagation time is acquired, the AP may perform the operations described below.

The AP may transmit information on the propagation time of the STA to the STA. The AP may transmit information on the propagation time respective to each of the multiple STAs to each of the multiple STAs performing UL MU transmission. Each of the multiple STAs may transmit uplink frames to the AP at transmitting timings of UIFS-Pg based on the information on the propagation time, which is received from the AP when performing uplink MU transmission. The UIFS may be decided as a time for performing transmission, after each of the multiple STAs has received a downlink frame. More specifically, the UIFS may be decided based on the processing time of the STA.

As another method, among the propagation time respective to each of the multiple STAs, the AP may transmit information on a maximum value (Max Pg) (maximum propagation time) or information on a sum of the UIFS and the maximum propagation time (UIFS+Max Pg) to the multiple STAs. Additionally, the AP may transmit information on the propagation time (Pg') respective to each of the multiple STAs to each of the multiple STAs performing UL MU transmission. Each of the multiple STAs may transmit uplink frames to the AP at transmitting timings of UIFS+Max Pg-Pg' based on the information on the propagation time, which is received from the AP when performing uplink MU transmission.

Hereinafter, a PPDU for performing communication between the STA and the AP according to the exemplary embodiment of the present invention will be disclosed.

Figure 6:
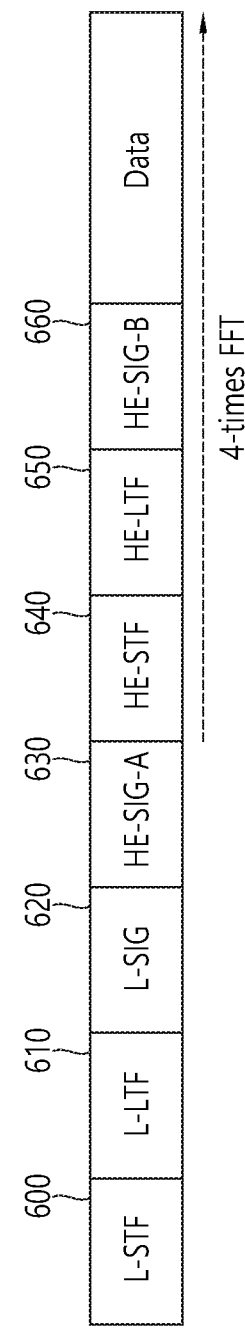
FIG. 6 is a conceptual view showing a PPDU according to an exemplary embodiment of the present invention.

FIG. 6 is a conceptual view showing a PPDU according to an exemplary embodiment of the present invention.

Referring to FIG. 6, a PPDU may include a PPDU header and a PSDU (physical protocol service data unit) (or MPDU (MAC protocol data unit)). The PPDU header may be used as a meaning include both PHY header and PHY preambles.

The PPDU header may include a legacy part and a non-legacy part, and the PSDU may correspond to a Data field. More specifically, the PPDU header may be divided into a legacy part, which corresponds to up to a L-SIG (legacy-signal), and a non-legacy part, which corresponds to a part after the L-SIG. The legacy part may correspond to part for supporting a legacy wireless LAN system (e.g., IEEE 802.11a/b/g/n/ac, and so on). In detail, the legacy part or L-part may follow the configuration of the L-STF, L-LTF, L-SIG, which maintains the exact format used in the legacy WiFi system. The non-legacy part may correspond to a part for supporting the next generation wireless LAN system (or non-legacy wireless LAN system) according to the exemplary embodiment of the present invention. In detail, the non-legacy part is a High Efficiency (HE) part that is newly configured for IEEE 802.11ax standard, which is a High Efficiency (HE) system. Herein, the order of the HE-STF and the HE-SIG may be changed, and the HE-LTF may be omitted. The HE-SIG may announce information for decoding Data (e.g., OFDMA, UL MU MIMO, Enhanced MCS), and so on. The L-part and the HE-part may each have a different FFT size (i.e., subcarrier spacing) and may each use a different CP.

The legacy part may include a L-STF (legacy short training field) 600, a L-LTF (legacy long training field) 610, and a L-SIG 620.

The L-STF 600 may include a short training OFDM symbol (short training orthogonal frequency division multiplexing symbol). The L-STF 600 may be used for frame detection, AGC (automatic gain control), diversity detection, and coarse frequency/time synchronization.

The L-LTF 610 may include a long training OFDM symbol (long training orthogonal frequency division multiplexing symbol). The L-LTF 610 may be used for fine frequency/time synchronization and channel prediction.

The L-SIG 620 may be used for transmitting control information. The L-SIG 620 may include information on data transmission rate, data length, and so on.

The non-legacy part may include non-legacy fields for supporting operations within a non-legacy WLAN system, such as HE (high efficiency)-SIG A 630, HE-STF 640, HE-LTF 650, and HE-SIG B 660. For example, the HE-SIG A 630 may be positioned after the L-SIG 620 of the legacy part. In order to support the non-legacy WLAN system, a signal field, such as HE-SIG A 630, may include diverse information. For example, in case channel access of multiple STAs is performed based on OFDMA (orthogonal frequency division multiple access), the HE-SIG A 630 may transmit information on frequency resource (e.g., channel) for data transmission and data reception, information on downlink resource allocation and uplink resource allocation, and so on, respective to each of the multiple STAs. Additionally, the HE-SIG A 630 may also include information for supporting uplink MIMO (multiple input multiple output). The HE-SIG A 630 may also include information for interference management of STAs in a dense environment having critical interference.

Additionally, the HE-SIG A 630 may also include color bits information for BSS identification information, bandwidth information, tail bit, CRC bit, MCS (modulation and coding scheme) information respective to the HE-SIG B 660, information on the number of symbols for the HE-SIG B 660, and CO (cyclic prefix) (or GI (guard interval)) length information.

The HE-STF 640 may be used for enhancing automatic gain control estimation in a MIMO (multiple input multiple output) environment or an OFDMA environment.

The HE-LTF 650 may be used for estimating a channel in a MIMO environment or an OFDMA environment.

The HE-SIG B 660 may include information on a length MCS of a PSDU (Physical layer service data unit) respective to each STA and tail bit, and so on. For example, the information on the MCS may be decided based on transmission power information or transmission power of the STA. The information on the MCS may include MCS indexes that are different from the MCS indexes that are indicated based on a polling frame or trigger frame transmitted by the AP for the UL-MU transmission. Additionally, the HE-SIG B 660 may also include information on an STA that is to receive the PPDU, OFDMA based resource allocation information (or MU-MIMO information). In case the OFDMA based resource allocation information (or MU-MIMO related information) is included in the HE-SIG B 660, the resource allocation information may not be included in the HE-SIG A 630.

The size of the IFFT (inverse fast fourier transform) being applied to the HE-STF 640 and the field after the HE-STF 640 may be different from the size of the IFFT being applied to the field before the HE-STF 640. For example, the size of the IFFT being applied to the HE-STF 640 and the field after the HE-STF 640 may be four time larger than the size of the IFFT being applied to the field before the HE-STF 640. The STA may receive the HE-SIG A 630 and may receive indications on the reception of a downlink PPDU based on the HE-SIG A 630. In this case, the STA may perform decoding based on a FFT size, which is changed starting from the HE-STF 640 and the field after the HE-STF 640. Conversely, in case the STA fails to receive indication on the reception of a downlink PPDU based on the HE-SIG A 630, the STA may stop the decoding process and may configure a NAV (network allocation vector). The CP (cyclic prefix) of the HE-STF 640 may have a size that is larger than the CP (cyclic prefix) of another field, and, during such CP interval, the STA may change the FFT size so as to perform decoding on the downlink PPDU.

The CP (cyclic prefix) of the HE-STF 640 may have a size that is larger than the CP of another field, and, during such CP interval, the STA may change the FFT size and may then perform decoding on a downlink PPDU.

In case an IFFT size being 4 times larger than the IFFT size that is used in the legacy part is used starting from the HE-STF 640 (e.g., a case when 64 IFFT is used in the legacy part with respect to the 20 MHz bandwidth, and when 256 FFT is applied in the non-legacy part with respect to the 20 MHz bandwidth), the duration of an OFDM symbol (or the total symbol duration) for the transmission of the HE-STF 640 may be equal to 16 µs.

In the non-legacy PPDU disclosed in FIG. 6, the total symbol duration ($T_{SYML\_HE}$) or the duration of the guard interval (GI) ($T_{GIS\_HE}$ or $T_{GI\_HE}$) may be changed, and such information may be transmitted by the AP. For example, the AP may transmit the information on the total symbol duration or the guard interval as the system information to the STA through a beacon frame or probe response frame, and so on. The STA may perform decoding on the PPDU based on the received information on the total symbol duration and/or the information on the duration of the guard interval. The AP or STA may vary the total symbol duration and/or guard interval duration that is used in the PPDU. More specifically, the PPDU is configurable.

The order of the fields configuring the PPDU, which is shown in FIG. 6, may be changed.

Figure 7:
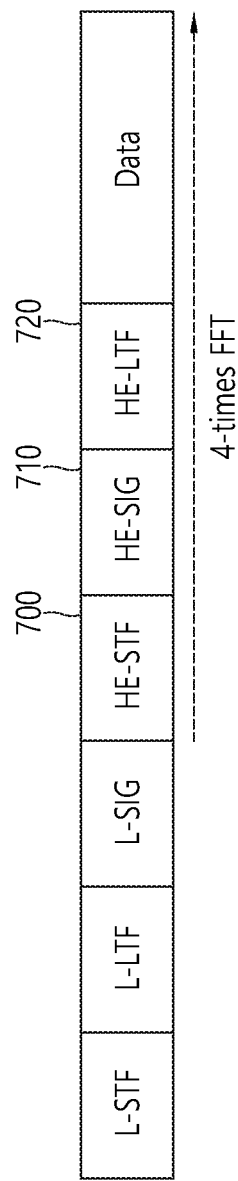
FIG. 7 is a conceptual view showing a PPDU according to an exemplary embodiment of the present invention.

FIG. 7 is a conceptual view showing a PPDU according to an exemplary embodiment of the present invention.

Referring to FIG. 7, a HE-STF 700, a HE-SIG 710, and a HE-LTF 720 may be sequentially included in the non-legacy part of the PPDU header.

In case the HE-STF 700 precedes the HE-SIG 710, the HE-STF 700 may include at least one of information on the bandwidth and identification information of the BSS.

For example, a sequence of the HE-STF 700 may indicate a bandwidth index. A pre-defined table may include information on a mapping relation between a sequence and a bandwidth. The HE-STF 700 may be decided in accordance with a transmission bandwidth based on this table. In case the HE-STF 700 precedes the HE-SIG 710 based on this method, the STA may acquire information on the bandwidth without performing blind detection.

Additionally, the HE-STF 700 may include identification information of the BSS. For example, the identification information of the BSS may correspond to information for identifying a BSS (or AP) that has transmitted the PPDU. Based on the BSS identification information, the STA may decide (or determine) whether the PPDU, which is received during the decoding step respective to the PPDU header, corresponds to a PPDU that is received from a target BSS (or target AP). The target BSS (or AP) may correspond to a BSS (or AP) from which the non-legacy STA wishes to receive the PPDU. The mapping relation between a sequence and BSS identification information may be pre-defined based on the table.

The HE-SIG 710 may include the information that is described above in FIG. 6, and the information being included in the HE-STF 700 may not be included in the HE-SIG 710.

The HE-LTF 720 may not include the information that is described above in FIG. 6.

Figure 8:
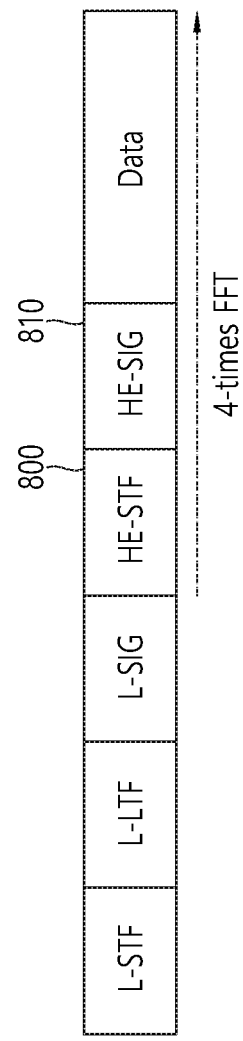
FIG. 8 is a conceptual view showing a PPDU according to an exemplary embodiment of the present invention.

FIG. 8 is a conceptual view showing a PPDU according to an exemplary embodiment of the present invention.

Referring to FIG. 8, a HE-STF 800 and a HE-SIG 810 may be sequentially included in the non-legacy part of the PPDU header.

In case the HE-STF 800 precedes the HE-SIG 810, as described above, the HE-STF 800 may include at least one of information on the bandwidth and identification information of the BSS.

The HE-SIG 810 may include the information that is described above in FIG. 6, and the information being included in the HE-STF 800 may not be included in the HE-SIG 810.

In case the HE-LTF is not included, the frequency resource for transmitting the HE-STF 800 and HE-SIG 810 and a data field may include a pilot tone (pilot subcarrier). The pilot tone may be used for channel tracking (e.g., CFO (channel frequency offset) tracking) and/or channel estimation. Within the frequency resource (or multiple subcarriers) for transmitting the HE-STF 800 and HE-SIG 810 and the data field, the pilot tone may be allocated within the same subcarrier index (or the same frequency resource).

In case the UL MU transmission is performed, in addition to the difference in the receiving timing, which was mentioned above as a problem that may occur, there also lie problems caused by a difference in the frequency offset, a difference in the receiving power, and so on. More specifically, since each of the multiple STAs has a different oscillator, in case the frequency offsets are indicated differently, it may be difficult to carry out the OFDMA based UL MU transmission. Additionally, in case the STA does not control the transmission power, the AP may receive the uplink frames, which are transmitted by each of the multiple STAs, at different power levels in accordance with the distance between the AP and the STAs or the channel environment. In this case, it may be difficult for the AP to detect (or search) uplink frames that are being received at a low (or weak) power level.

Accordingly, in order to successfully perform the UL MU transmission, it may be required to correct the time, frequency, and power when transmitting the UL MU frame.

Hereinafter, the exemplary embodiment of the present invention discloses a method for correcting a time difference and a frequency difference that may occur during the UL MU transmission.

Figure 9:
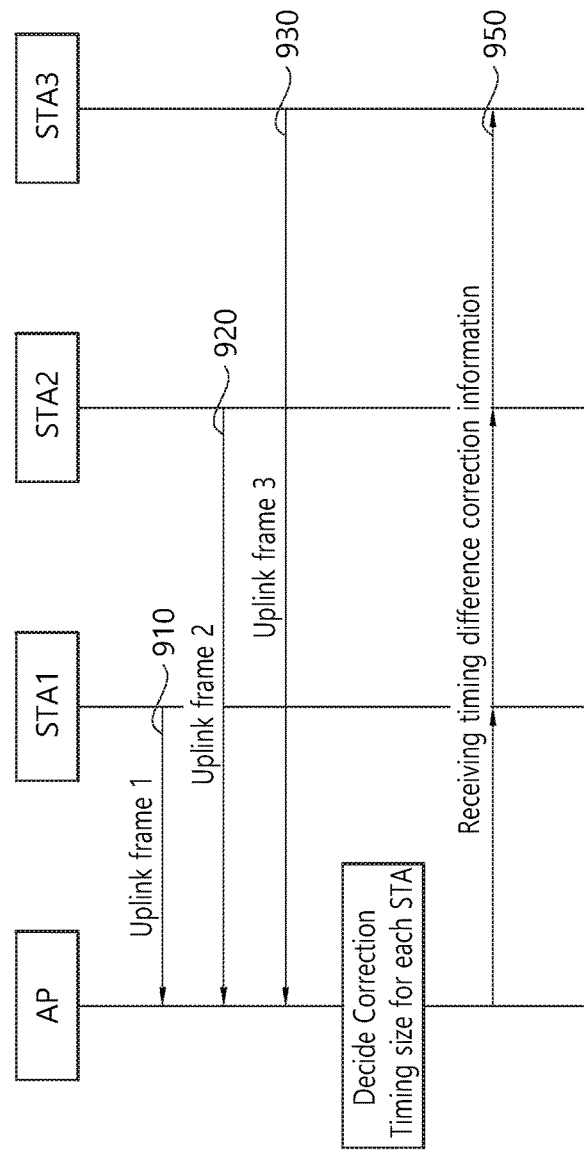
FIG. 9 is a conceptual view showing a receiving timing correction method according to an exemplary embodiment of the present invention.

FIG. 9 is a conceptual view showing a receiving timing correction method according to an exemplary embodiment of the present invention.

In order to successfully receive the uplink frames, which have been transmitted based on a UL MU transmission, the gap between the receiving timings (or time difference) between the multiple uplink frames, which have been transmitted by multiple STAs, and which are being received by the AP, should be within a correctable range of the AP.

Table 1 shown below indicates a difference in the receiving timing of the STAs being operated indoors and outdoors.

TABLE 1

|  | Indoor (scenario 3) | Outdoor (scenario 4) |
|---|---|---|
| BSS Radius | 20 meters | 150 meters |
| 95% channel delay | 58 nsec | 700/1200 nsec in UMi/UMa |
| Max. round trip delay | 67 nsec | 500 nsec |
| Time difference or Receiving timing difference | 125 nsec | 1200 nsec~1700 nsec |

Referring to Table 1, the difference in the receiving timing between the STAs located indoors and outdoors respectively correspond to 125 nsec and 1200~1700 nsec. In case such difference in the receiving timing is within a correctable range, the AP may perform decoding on the received multiple uplink frames. More specifically, in case the multiple uplink frames are transmitted via UL MU transmission based on OFDMA, and if the difference in the receiving timing of the multiple uplink frames is within a correction range, an IFFT based transform of the multiple uplink frames may be performed.

In case the difference in the receiving timing is less than or equal to a CP (or GI) length of an OFDM symbol transmitting the multiple uplink frames, it may be determined that the difference in the receiving timing is within the correction range. Conversely, in case the difference in the receiving timing is greater than a GI length of an OFDM symbol transmitting the multiple uplink frames, it may be determined that the difference in the receiving timing is outside of the correction range. A duration of the OFDM symbol may correspond to a sum of a GI duration and a valid symbol duration.

Therefore, in order to perform successful decoding on the multiple uplink frames, the length of the GI should be greater than the difference in the receiving timing. More specifically, in case the GI length (or CP length) is greater than or equal to the receiving timing, a difference correction procedure is not required to be performed separately, and, in case the GI length is less than the receiving timing, a difference correction procedure is required to be performed. In case the GI length (e.g., 0.8 μs), which was used in the legacy 802.11ac, is used herein, since the GI length is greater than the difference in the receiving timing (0.125 μs) in an indoor environment, a correction procedure is not required to be carried out with respect to the difference in the receiving timing. However, since the GI length is less than the difference in the receiving timing (1.2~1.7 μs), a correction procedure is required to be carried out with respect to the difference in the receiving timing. By performing the correction procedure with respect to the difference in the receiving timing, the difference in the receiving timing (or time difference) may be adjusted to 400 ns or less.

Figure 10:
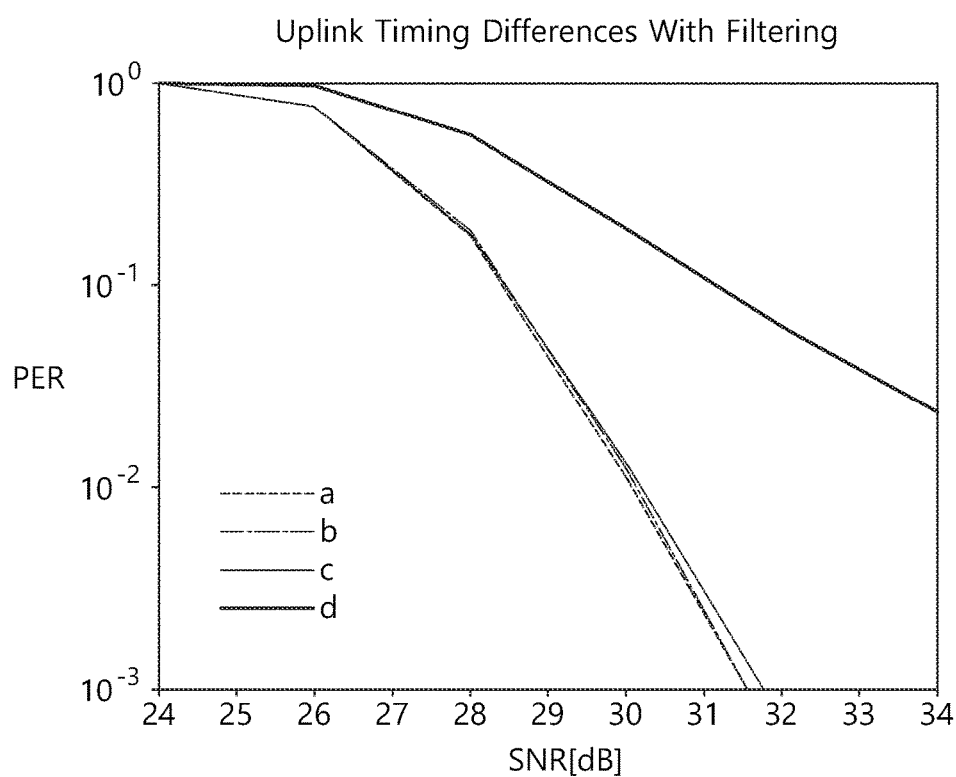
FIG. 10 is a graph showing a SNR performance respective to a time difference (or receiving timing gap (or difference)).

FIG. 10 is a graph showing a SNR performance respective to a time difference (or receiving timing gap (or difference)).

FIG. 10 shows a SNR performance respective to a difference in the receiving timing of a single stream in the AP, which receives 6 single streams. The SNR performance respective to the difference in the receiving timing of the single streams has been measured under the same condition (MMSE (minimum mean square error) ideal training, 1000B packet, 64-QAM, rate 5/6, D-NLOS (non line of sight) channel).

Referring to FIG. 10, although there is no significant difference in the SNR performance in case the time difference is equal to 0, 200 ns, and 400 ns, in case the time difference is equal to 600 ns, it is apparent that the SNR performance decreases significantly.

Although the difference in the receiving timing is adjusted to 400 ns and below due to the above-described reasons, the difference in the receiving timing may also be adjusted to a different size. In order to adjust the difference in the receiving timing of the uplink frames being transmitted by the multiple STAs, the AP may transmit information for correcting the difference (or receiving difference correction information) to each of the multiple STAs or to at least one of the multiple STAs. For example, the AP may adjust the difference in the receiving timing based on the indication indexes shown below.

TABLE 2

| Indication index | Timing value that is to be corrected |
|---|---|
| 0b000 | −800 nsec |
| 0b001 | −600 nsec |
| 0b010 | −400 nsec |
| 0b011 | −200 nsec |
| 0b100 | 0 nsec |
| 0b101 | 200 nsec |
| 0b110 | 400 nsec |
| 0b111 | 600 nsec |

The AP may transmit indication indexes indicating the size of the corrected timing within the range of −800 nsec~600 nsec to the STA, as shown in Table 2. The AP may decide the size of the corrected timing respective to each of the multiple STAs based on a communication between the AP and the multiple STAs, which perform UL MU transmission. The AP may transmit the decided size of the corrected timing to each of the multiple STAs.

Referring to FIG. 9, the AP may respectively receive Uplink Frame 1 910, Uplink Frame 2 920, and Uplink Frame 3 930 from each of STA1, STA2, and STA3. The AP may decide the size of the corrected timing for each STA and may respectively transmit receiving timing difference information 950 including the index indicating the size of the corrected timing to STA1, STA2, and STA3.

Figure 11:
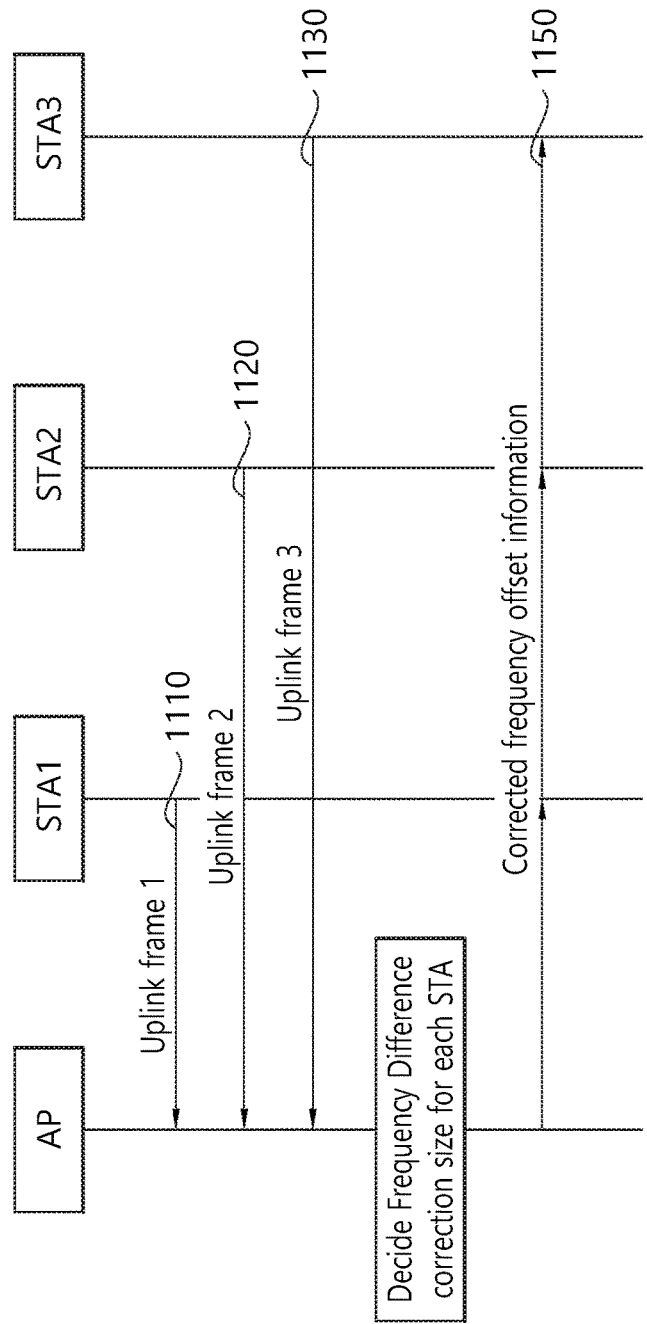
FIG. 11 is a conceptual view showing a frequency difference correction method according to an exemplary embodiment of the present invention.

FIG. 11 is a conceptual view showing a frequency difference correction method according to an exemplary embodiment of the present invention.

In case the PPDU is transmitted from on STA, the frequency offset may be decided based on the STF and the LTF, which are included in the PPDU. The PPDUs that are transmitted by the multiple STAs performing UL MU transmission may have different frequency offset. The difference in the frequency offsets between the PPDUs being transmitted by the multiple STAs may also be expressed by using the term frequency difference.

In the exemplary embodiment of the present invention, a method for correcting frequency offsets based on the frequency differences respective the multiple STAs performing UL MU transmission is disclosed.

Generally, when the STA transmits an uplink PPDU to the AP, the AP may decide the frequency offset respective to the STA based on the STF and the LTF, which are included in the uplink PPDU.

More specifically, the AP may obtain a correlation of the sequences that are repeated in the STF and the LTF and may then correct the phase value. The AP may notify the phase value to the STA and may instruct the STA to perform correction of the frequency offset. The STAs that have corrected the frequency offset based on the frequency offset information, which is transmitted from the AP, may have little or no frequency difference. Therefore, the AP may perform UL MU transmission without any correction procedure respective to the frequency difference.

Most particularly, the AP may generate corrected frequency offset information based on the uplink PPDU, which is received from each of the multiple STAs performing UL MU transmission, and may then transmit the generated corrected frequency offset information to each of the multiple STAs based on a downlink transmission. For example, the uplink PPDU, which is used for generating the corrected frequency offset information of the AP, may correspond to a PPDU carrying a frame that was already defined or a newly defined frame. The AP may transmit the corrected frequency offset information based on the uplink transmission indication frame, the NDPA frame, and so on.

The corrected frequency offset information may correspond to information for correcting the difference between the frequency bands (frequency difference) transmitting each of the multiple uplink frames, which are transmitted by each of the multiple STAs.

Figure 12:
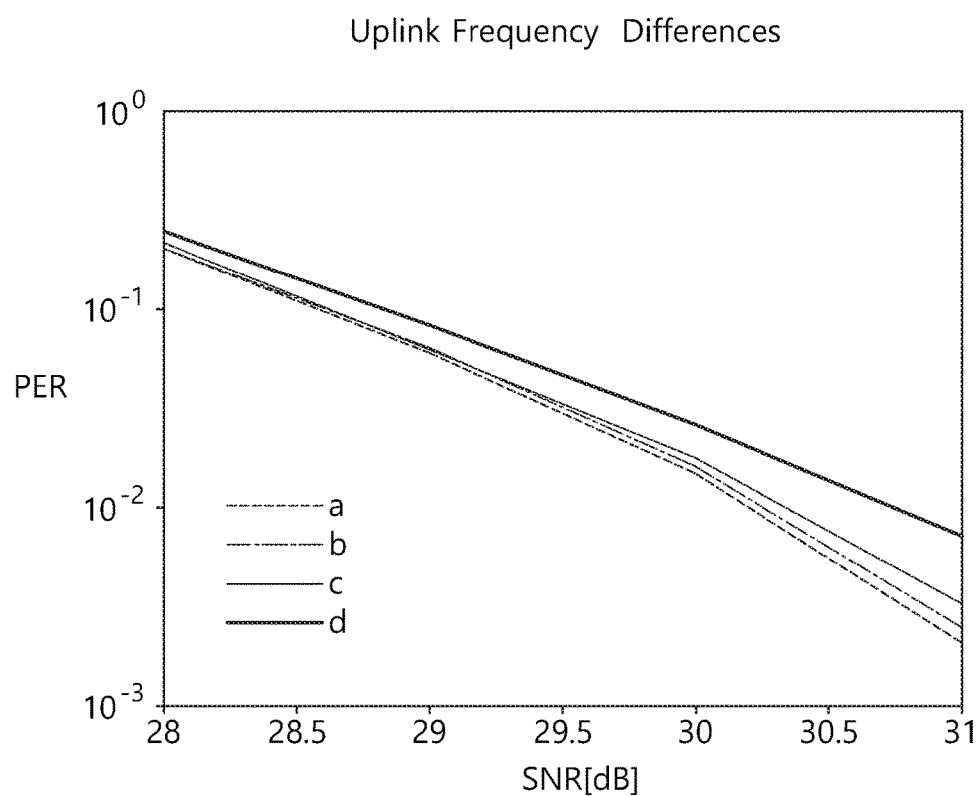
FIG. 12 is a graph showing a SNR performance respective to a frequency difference.

FIG. 12 is a graph showing a SNR performance respective to a frequency difference.

FIG. 12 shows a SNR performance respective to a difference in the receiving timing of a single stream in an AP, which receives 6 single streams. Herein, the SNR performance respective to the frequency difference of a single stream has been measured under the same condition (MMSE ideal training with pilot phase tracking per client, 1000B packet, 64-QAM, rate 5/6, D-NLOS (non line of sight) channel).

Referring to FIG. 12, in case the frequency difference corresponds to 0, 2 kHz, and 4 kHz, although the difference in the SNR performance is not significant, in case the frequency difference corresponds to 8 kHz, it will be apparent that the SNR performance has been significantly degraded. Generally, in a bandwidth of 20 MHz, a difference of 20 ppm (part per million) (±48 kHz=96 kHz), is generated, and, when referring to the graph, when 64-QAM 5/6, in case the frequency difference corresponds to 8 MHz, performance degradation of 0.5 dB occurs in the 10e-1 PER (packet error rate).

Although the frequency difference is controlled to 4 kHz or below for the above-described reason, the frequency difference may also be controlled to another size. The AP may transmit the information for frequency difference correction to each of the multiple STAs or to at least one of the multiple STAs. For example, the AP may control the frequency difference based on the indication index shown below.

Considering the difference between the multiple users, in case the difference allowed to one STA is controlled to 4 kHz or below, 96 kHz is quantized to units of 4 kHz or below, thereby configuring 96/4=24 levels.

For example, in order to perform frequency difference correction, 5-bit information may be used as shown below in Table 3.

TABLE 3

| Indication index | Frequency difference correction size |
|---|---|
| 0x00000 | −48 kHz |
| 0x00001 | −45 kHz |
| ... | ... |
| 0x01111 | −3 kHz |
| 0x10000 | 0 kHz |
| 0x10001 | 3 kHz |
| ... | ... |
| 0x11111 | 45 kHz |

For example, the AP may transmit the corrected frequency offset information including the indication indexes shown in Table 2 to at least one STA or to each of the multiple STAs performing the UL MU transmission.

Referring to FIG. 11, the AP may respectively receive Uplink Frame 1 1110, Uplink Frame 2 1120, and Uplink Frame 3 1130 from STA1, STA2, and STA3. The AP may decide the size of the frequency difference correction per STA and may transmit the corrected frequency offset information 1150 to STA1, STA2, and STA3.

Figure 13:
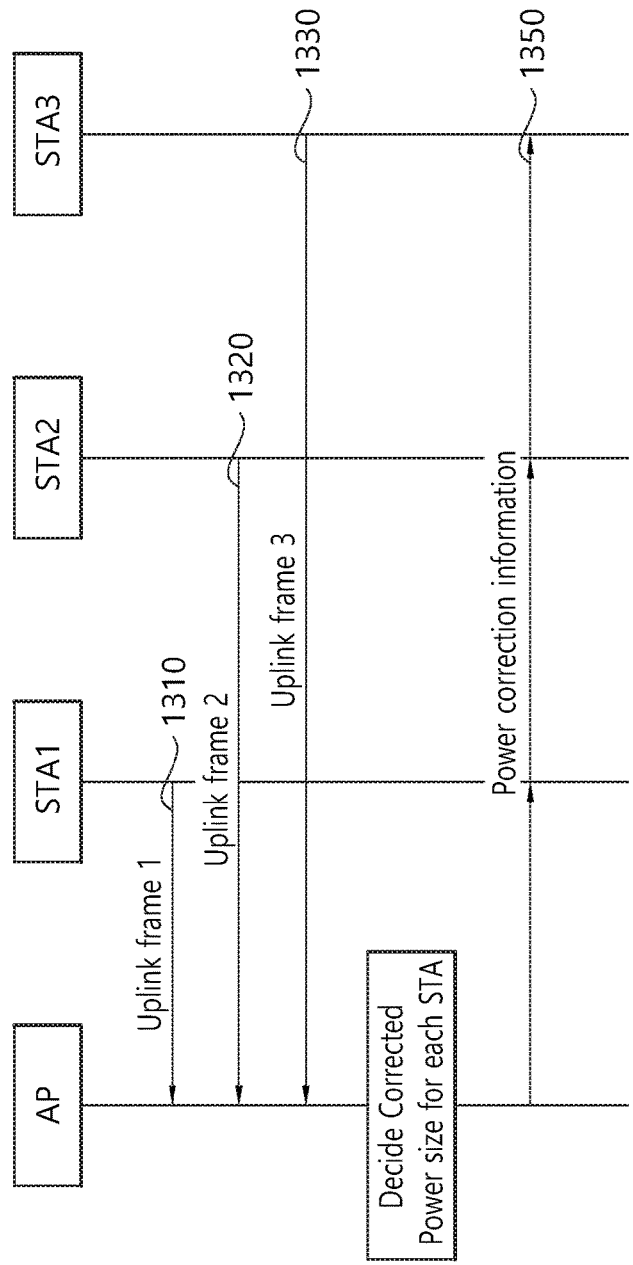
FIG. 13 is a conceptual view showing a power difference correction method according to an exemplary embodiment of the present invention.

FIG. 13 is a conceptual view showing a power difference correction method according to an exemplary embodiment of the present invention.

FIG. 13 discloses a method for correcting power difference between uplink frames that are being transmitted to the AP based on UL MU transmission.

In case a difference in the receiving power of the multiple uplink frames that are being transmitted to the AP based on UL MU transmission exists, it may be difficult for the AP to decide the quantization level for AGC, and so on.

Figure 14:
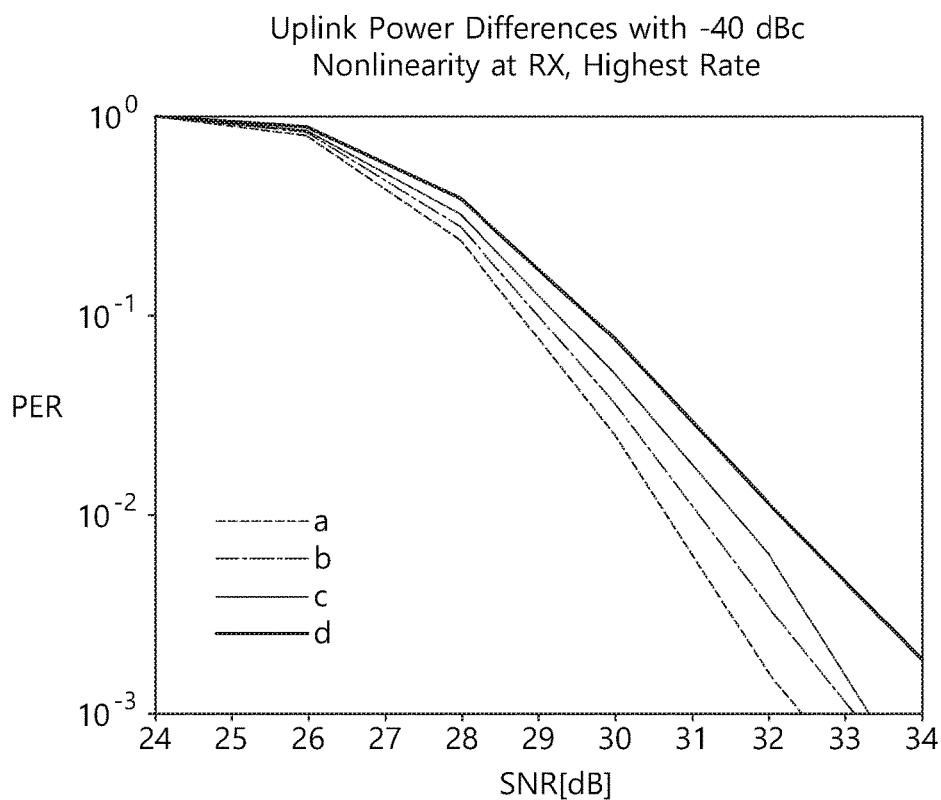
FIG. 14 is a graph showing performance degradation caused by an uplink receiving power difference according to an exemplary embodiment of the present invention.

FIG. 14 is a graph showing performance degradation caused by an uplink receiving power difference according to an exemplary embodiment of the present invention.

Referring to FIG. 14, the STA using the lowest power 64QAM 5/6 shows a performance degradation of 1.5 dB occurs in 10e-2 due to a power difference of 8 dB. As an experiment related to UL MU MIMO, when applied to UL OFDMA, the performance degradation may become relatively low. The SNR performance respective to the difference in the power of the single streams has been measured under the same condition (MMSE ideal training, 1000B packet, 64-QAM, rate 5/6, D-NLOS (non line of sight) channel).

A receiving end of the AP has an −40 dBc I/Q imbalance. Referring to the graph of FIG. 14, in case the power difference respectively corresponds to 0, 4 dB, 6 dB, and 8 dB, the relation between PER and SNR is disclosed.

TABLE 4

| | InH LoS | InH NLoS | UMi LoS | UMi NLoS |
|---|---|---|---|---|
| BSS Distance | 3~12 meter | 3~60 meter | 10~130 meter | 10~130 meter |
| PL (dB) | 48.47~58.64 | 39.76~90.10 | 57.6~82.11 | 69.29~110.17 |

Referring to Table 4, as the BSS distance increases, the power loss respective to the path loss may correspond to approximately 40~110 dB. Therefore, the power difference may cause critical performance degradation. Therefore, an indication for controlling the power may be required.

However, due to the CCA problem (or since the STA is already transmitting frames at a maximum power in the wireless LAN system), it may be difficult to command an increase in the transmission power of the STA. Accordingly, the AP may send a command to decrease the transmission power. For example, as shown below in Table 5, the AP may transmit power correction information of 4 bits to the STA.

TABLE 5

| Indication index | Power Size that is to be corrected |
|---|---|
| 0x0000 | 0 dB |
| 0x0001 | 4 dB |
| ... | ... |
| 0x1111 | 64 dB |

The AP may transmit indication indexes respective to the transmission power, which are shown in Table 5, and may correct the transmission power of the STA.

Referring to FIG. 13, the AP may respectively receive Uplink Frame 1 1310, Uplink Frame 2 1320, and Uplink Frame 3 1330 from STA1, STA2, and STA3. The AP may decide the size of the power correction per STA and may transmit the corrected power information 1350 to STA1, STA2, and STA3.

In FIG. 9 to FIG. 14, indication methods that can respectively correct time difference, frequency difference, and power difference have been disclosed. The information for correcting each of the time difference/frequency difference/ power difference (e.g., receiving timing difference correction information, corrected frequency offset information, and power correction information) may be collectively transmitted, or only the required information may be optionally transmitted.

In case 3 bits are used for the receiving timing difference correction information, 5 bits are used for the corrected frequency offset information, and 4 bits are used for the power correction information, information respective to the time difference, the frequency difference, and the power difference may be transmitted through a total of 12 bits.

For example, since there are limitations in decreasing the power, the AP may perform grouping of the multiple STAs each having the most similar transmission power as possible and may then indicate the UL MU transmission. In this case, only the information for correcting the time difference and the frequency difference (e.g., receiving timing difference correction information and corrected frequency offset information) may be transmitted.

Such information for correcting each of the time difference/frequency difference/power difference may be transmitted through an indication frame for uplink sounding (NDPA (null data packet announcement) format) or may be transmitted based on a UL MU scheduling frame, which is a frame for scheduling UL MU transmission. Alternatively, regardless of the UL MU transmission procedure, the information for respectively correcting the time difference/frequency difference/power difference, when each of the multiple STAs performs SU (single user) transmission, may be included in the ACK frame or block ACK frame and then be transmitted. For example, in case the power correction information is added to the block ACK frame, a portion of the reserved 9 bits of the block ACK control field (BA control field) may be used. Alternatively, a new ACK frame or block ACK frame format may be defined in the field including the information for respectively correcting the time difference/frequency difference/power difference.

Figure 15:
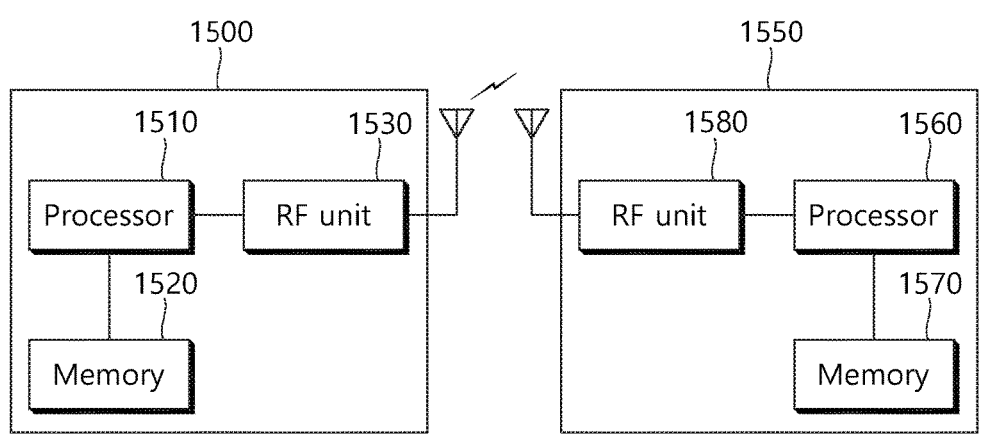
FIG. 15 illustrates a block diagram showing a wireless communication system in which the disclosure of this specification is implemented.

FIG. 15 illustrates a block diagram showing a wireless communication system in which the disclosure of this specification is implemented.

Referring to FIG. 15, as an STA that can realize the above-described exemplary embodiment, the wireless device 1500 may correspond to an AP 1500 or a non-AP STA (non-AP station) 1550.

The AP 1500 includes a processor 1510, a memory 1520, and a RF unit (radio frequency unit) 1530.

The RF unit 1530 is connected to the processor 1510, thereby being capable of transmitting and/or receiving radio signals.

The processor 1510 implements the functions, processes, and/or methods proposed in the present invention. For example, the processor 1510 may be realized to perform the operations of the wireless device according to the above-described exemplary embodiments of the present invention. The processor may perform the operations of the wireless device, which are disclosed in the exemplary embodiments of FIG. 1 to FIG. 14.

For example, the processor 1510 may be configured to transmit the uplink transmission indication frame to multiple STAs and to receive an uplink frame from the multiple STAs. The uplink transmission indication frame may include information for correcting time difference, frequency difference, and power difference.

The STA 1550 includes a processor 1560, a memory 1570, and a RF unit (radio frequency unit) 1580.

The RF unit 1580 is connected to the processor 1560, thereby being capable of transmitting and/or receiving radio signals.

The processor 1560 implements the functions, processes, and/or methods proposed in the present invention. For example, the processor 1560 may be realized to perform the operations of the wireless device according to the above-described exemplary embodiments of the present invention. The processor may perform the operations of the wireless device, which are disclosed in the exemplary embodiments of FIG. 1 to FIG. 14.

For example, the processor 1560 may be implemented to receive the uplink transmission indication frame from the AP and to transmit a first uplink frame to the AP as a response to the uplink transmission indication frame. The uplink transmission indication frame may indicate the transmission of the first uplink frame and a second uplink frame within an overlapping time resource, and the first uplink frame may be transmitted at a transmitting timing, which is decided based on an UIFS (uplink interframe space), and the UIFS may correspond to a fixed value.

The processor 1510 and 1560 may include an ASIC (application-specific integrated circuit), another chip set, a logical circuit, a data processing device, and/or a converter converting a baseband signal and a radio signal to and from one another. The memory 1520 and 1570 may include a ROM (read-only memory), a RAM (random access memory), a flash memory, a memory card, a storage medium, and/or another storage device. The RF unit 1530 and 1580 may include one or more antennas transmitting and/or receiving radio signals.

When the exemplary embodiment is implemented as software, the above-described method may be implemented as a module (process, function, and so on) performing the above-described functions. The module may be stored in the memory 1520 and 1570 and may be executed by the processor 1510 and 1560. The memory 1520 and 1570 may be located inside or outside of the processor 1510 and 1560 and may be connected to the processor 1510 and 1560 through a diversity of well-known means.

What is claimed is:

1. A method for transmitting a frame in a wireless local area network (LAN), comprising:

transmitting, by an access point (AP), a physical layer protocol data unit (PPDU) comprising an uplink transmission indication frame triggering transmission of a plurality of uplink frames from a plurality of stations, wherein uplink transmission power indexes for the plurality of stations are separately configured by the uplink transmission indication frame, wherein modulation and coding scheme (MCS) indexes for the plurality of uplink frames are separately configured by the uplink transmission indication frame, wherein the PPDU includes a legacy part and a non-legacy part following the legacy part, wherein the legacy part and the non-legacy part of the PPDU are corresponding to a same channel bandwidth, wherein the legacy part comprises a legacy short training field (L-STF), a legacy long training field (L-LTF), and a legacy signal (L-SIG) field, wherein the non-legacy part comprises a high efficiency short training field (HE-STF), a high efficiency long training field (HE-LTF), and a data field, wherein a first subcarrier spacing applied to the legacy part is different from a second subcarrier spacing applied to the non-legacy part; and in response to the uplink transmission indication frame, receiving, by the AP, the plurality of uplink frames from the plurality of stations on an overlapped time duration, wherein the plurality of uplink frames are configured based on the uplink transmission power indexes and the MCS indexes.

2. The method of claim 1, wherein frequency resources for the plurality of uplink frames are separately configured by the uplink transmission indication frame.

3. The method of claim 2, wherein the plurality of uplink frames are received based on multiple-user (MU) orthogonal frequency division multiple access (OFDMA) scheme.

4. The method of claim 1, wherein the uplink transmission indication frame indicates identifiers of the plurality of stations.

5. An access point (AP) in a wireless local area network (LAN), comprising:

a radio frequency unit configured to transmit and receive a radio signal; and a processor coupled to the radio frequency unit and configured to:

transmit a physical layer protocol data unit (PPDU) comprising an uplink transmission indication frame triggering transmission of a plurality of uplink frames from a plurality of stations, wherein uplink transmission power indexes for the plurality of stations are separately configured by the uplink transmission indication frame, wherein modulation and coding scheme (MCS) indexes for the plurality of uplink frames are separately configured by the uplink transmission indication frame, wherein the PPDU includes a legacy part and a non-legacy part following the legacy part, wherein the legacy part and the non-legacy part of the PPDU are corresponding to a same channel bandwidth, wherein the legacy part comprises a legacy short training field (L-STF), a legacy long training field (L-LTF), and a legacy signal (L-SIG) field, wherein the non-legacy part comprises a high efficiency short training field (HE-STF), a high efficiency long training field (HE-LTF), and a data field, wherein a first subcarrier spacing applied to the legacy part is different from a second subcarrier spacing applied to the non-legacy part; and in response to the uplink transmission indication frame, receive the plurality of uplink frames from the plurality of stations on an overlapped time duration, wherein the plurality of uplink frames are configured based on the uplink transmission power indexes and the MCS indexes.

6. The access point of claim 5, wherein frequency resources for the plurality of uplink frames are separately configured by the uplink transmission indication frame.

7. The access point of claim 6, wherein the plurality of uplink frames are received based on multiple-user (MU) orthogonal frequency division multiple access (OFDMA) scheme.

8. The access point of claim 5, wherein the uplink transmission indication frame indicates identifiers of the plurality of stations.

9. A wireless station in a wireless local area network (LAN), comprising:
- a radio frequency unit configured to transmit and receive a radio signal; and
- a processor coupled to the radio frequency unit and configured to:
- receive, from an access point (AP), a physical layer protocol data unit (PPDU) comprising an uplink transmission indication frame triggering transmission of a plurality of uplink frames from a plurality of stations, wherein the uplink transmission indication frame includes uplink transmission power indexes separately configured for the plurality of stations, wherein the uplink transmission indication frame further includes modulation and coding scheme (MCS) indexes separately configured for the plurality of uplink frames, wherein the PPDU includes a legacy part and a non-legacy part following the legacy part, wherein the legacy part and the non-legacy part of the PPDU are corresponding to a same channel bandwidth, wherein the legacy part comprises a legacy short training field (L-STF), a legacy long training field (L-LTF), and a legacy signal (L-SIG) field, wherein the non-legacy part comprises a high efficiency short training field (HE-STF), a high efficiency long training field (HE-LTF), and a data field, wherein a first subcarrier spacing applied to the legacy part is different from a second subcarrier spacing applied to the non-legacy part;
- in response to the uplink transmission indication frame, configure a uplink frame based on a corresponding uplink transmission power index and a corresponding MCS index for the wireless station; and
- transmit the configured uplink frame to the AP on an overlapped time duration, during which the plurality of uplink frames are transmitted to the AP.

10. The wireless station of claim 9, wherein frequency resources for the plurality of uplink frames are separately configured by the uplink transmission indication frame.

11. The wireless station of claim 10, wherein the plurality of uplink frames are transmitted based on multiple-user (MU) orthogonal frequency division multiple access (OFDMA) scheme.

12. The wireless station of claim 9, wherein the uplink transmission indication frame indicates identifiers of the plurality of stations.

13. The method of claim 1, wherein the same channel bandwidth is 20 MHz, and wherein the first subcarrier spacing is four times greater than the second subcarrier spacing.

14. The access point of claim 5, wherein the same channel bandwidth is 20 MHz, and wherein the first subcarrier spacing is four times greater than the second subcarrier spacing.

15. The wireless station of claim 9, wherein the same channel bandwidth is 20 MHz, and wherein the first subcarrier spacing is four times greater than the second subcarrier spacing.

* * * * *